(12) United States Patent
Hwangbo et al.

(10) Patent No.: US 9,939,989 B2
(45) Date of Patent: Apr. 10, 2018

(54) USER INTERFACE FOR DISPLAYING AND PLAYING MULTIMEDIA CONTENTS, APPARATUS COMPRISING THE SAME, AND CONTROL METHOD THEREOF

(71) Applicant: Samsung Electronics Co., Ltd, Suwon-si, Gyeonggi-do (KR)

(72) Inventors: Kyoung Nyo Hwangbo, Suwon-si (KR); Tae Hyun Ku, Incheon (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 848 days.

(21) Appl. No.: 14/290,117

(22) Filed: May 29, 2014

(65) Prior Publication Data

US 2014/0281998 A1    Sep. 18, 2014

Related U.S. Application Data

(63) Continuation of application No. 12/139,665, filed on Jun. 16, 2008, now abandoned.

(30) Foreign Application Priority Data

Nov. 16, 2007   (KR) ......................... 10-2007-0117095

(51) Int. Cl.
*G06F 3/0481*   (2013.01)
*G06F 3/0482*   (2013.01)
(Continued)

(52) U.S. Cl.
CPC .......... *G06F 3/0482* (2013.01); *G06F 3/0487* (2013.01); *G06F 3/04817* (2013.01);
(Continued)

(58) Field of Classification Search
CPC ..................................................... G06F 3/0481
(Continued)

(56) References Cited

U.S. PATENT DOCUMENTS 5,680,558 A  * 10/1997  Hatanaka ............ G06F 3/04817
                                                             707/E17.005
6,700,612 B1 *  3/2004  Anderson ............ H04N 1/0035
                                                                348/333.05
(Continued)

FOREIGN PATENT DOCUMENTS

JP         2001-306375         11/2001
JP         2004-356867         12/2004
(Continued)

OTHER PUBLICATIONS

Korean Office Action dated Apr. 2, 2014 in Application No. 10-2007-0117095.
(Continued)

*Primary Examiner* — Reza Nabi
(74) *Attorney, Agent, or Firm* — Staas & Halsey LLP

(57) ABSTRACT

A user interface for displaying and playing multimedia contents is capable of allowing the user to easily recognize information about multimedia contents at a glance, and allowing the user to more easily retrieve desired information, through an image pre-play function. An apparatus includes the user interface, and a control method for the apparatus are includes displaying a sorting item of a multimedia content, and arranging file information included in the sorting item and having the form of a playable image.

6 Claims, 19 Drawing Sheets

(51) Int. Cl.
*G06F 3/0488* (2013.01)
*G06F 17/30* (2006.01)
*G06F 3/0484* (2013.01)
*G06F 3/0487* (2013.01)

(52) U.S. Cl.
CPC ...... *G06F 3/04842* (2013.01); *G06F 3/04845* (2013.01); *G06F 3/04883* (2013.01); *G06F 17/30058* (2013.01); *G06F 17/30265* (2013.01); *G06F 17/30274* (2013.01); *G06F 17/30749* (2013.01); *G06F 17/30775* (2013.01); *G06F 17/30849* (2013.01)

(58) Field of Classification Search
USPC ............................................... 715/716
See application file for complete search history.

(56) References Cited

U.S. PATENT DOCUMENTS

| | | | | |
|---|---|---|---|---|
| 7,013,284 | B2* | 3/2006 | Guyan | G06Q 10/06311 705/4 |
| 7,082,577 | B1* | 7/2006 | Brosnahan | G06F 3/0481 715/767 |
| 7,358,962 | B2* | 4/2008 | Dehlin | G06F 3/011 345/156 |
| 7,614,011 | B2* | 11/2009 | Karidis | G06F 1/3203 345/212 |
| 7,739,271 | B2 | 6/2010 | Cook et al. | |
| 7,765,479 | B2 | 7/2010 | Goodwin et al. | |
| 7,873,356 | B2* | 1/2011 | Flynt | G06F 3/0482 455/418 |
| 8,201,096 | B2* | 6/2012 | Robert | G06F 3/04817 715/713 |
| 8,341,545 | B2* | 12/2012 | Hebard | G06F 17/212 715/767 |
| 2002/0112237 | A1* | 8/2002 | Kelts | G06F 3/0481 725/39 |
| 2002/0174430 | A1* | 11/2002 | Ellis | G11B 27/005 725/46 |
| 2003/0053240 | A1* | 3/2003 | Bruner | G06F 3/0605 360/69 |
| 2003/0081353 | A1* | 5/2003 | Fletcher | G06F 3/0605 360/255 |
| 2003/0112467 | A1* | 6/2003 | McCollum | G06F 3/0482 358/1.18 |
| 2004/0158862 | A1* | 8/2004 | Nam | H04N 5/44543 725/52 |
| 2004/0189690 | A1* | 9/2004 | Poslinski | G11B 27/105 715/719 |
| 2005/0010955 | A1* | 1/2005 | Elia | G06F 3/0482 725/88 |
| 2005/0160377 | A1* | 7/2005 | Sciammarella | G06F 3/0481 715/838 |
| 2005/0268252 | A1* | 12/2005 | Parker | G06F 3/0231 715/810 |
| 2005/0275636 | A1* | 12/2005 | Dehlin | G06F 3/011 345/173 |
| 2006/0020962 | A1* | 1/2006 | Stark | G06F 17/30861 725/32 |
| 2006/0026524 | A1* | 2/2006 | Ma | G06F 17/30793 715/713 |
| 2006/0080716 | A1* | 4/2006 | Nishikawa | G06F 17/30849 725/89 |
| 2006/0087502 | A1* | 4/2006 | Karidis | G06F 1/3203 345/211 |
| 2006/0189437 | A1* | 8/2006 | Cohen | G09B 7/02 482/7 |
| 2006/0200775 | A1* | 9/2006 | Behr | G06F 3/0481 715/767 |
| 2006/0236342 | A1* | 10/2006 | Kunkel | H04N 5/44543 725/52 |
| 2006/0268100 | A1* | 11/2006 | Karukka | G06F 3/0482 348/14.01 |
| 2007/0067272 | A1* | 3/2007 | Flynt | G06F 3/0482 |
| 2007/0124773 | A1* | 5/2007 | Morris | H04N 5/44543 725/61 |
| 2007/0150810 | A1* | 6/2007 | Katz | G06F 3/0481 715/229 |
| 2007/0214473 | A1* | 9/2007 | Barton | G11B 27/105 725/28 |
| 2008/0031595 | A1* | 2/2008 | Cho | G11B 27/34 386/278 |
| 2008/0062141 | A1* | 3/2008 | Chandhri | G06F 3/0482 345/173 |
| 2008/0086747 | A1* | 4/2008 | Rasanen | H04N 21/4828 725/46 |
| 2008/0250319 | A1 | 10/2008 | Lee et al. | |
| 2008/0267576 | A1* | 10/2008 | Seo | G11B 27/007 386/241 |
| 2008/0307343 | A1* | 12/2008 | Robert | G06F 3/04817 715/765 |
| 2009/0002335 | A1* | 1/2009 | Chaudhri | G06F 3/04815 345/173 |
| 2009/0024602 | A1* | 1/2009 | Ohlfs | G06F 17/30817 |
| 2009/0063975 | A1* | 3/2009 | Bull | G06F 17/30749 715/716 |
| 2009/0132921 | A1* | 5/2009 | Hwangbo | G06F 3/0482 715/716 |
| 2009/0138459 | A1* | 5/2009 | Walter | G06F 17/30828 |
| 2009/0158326 | A1* | 6/2009 | Hunt | G06F 3/04817 725/38 |
| 2009/0177301 | A1* | 7/2009 | Hayes | G11B 19/025 700/94 |
| 2009/0198359 | A1* | 8/2009 | Chaudhri | G06F 3/0482 700/94 |
| 2009/0228544 | A1* | 9/2009 | Demers | G06F 17/30058 709/201 |
| 2009/0259939 | A1* | 10/2009 | Lockett | H04N 5/4403 715/716 |
| 2009/0271283 | A1* | 10/2009 | Fosnacht | G06Q 20/123 705/26.1 |
| 2010/0031193 | A1* | 2/2010 | Stark | G06F 17/30861 715/810 |
| 2010/0050080 | A1* | 2/2010 | Libert | G06F 17/30038 715/716 |
| 2010/0162115 | A1* | 6/2010 | Ringewald | G06F 17/30743 715/716 |
| 2010/0169786 | A1* | 7/2010 | O'Brien | G06F 17/30817 715/738 |
| 2010/0220978 | A1* | 9/2010 | Ogikubo | G06F 3/04815 715/716 |
| 2010/0251304 | A1* | 9/2010 | Donoghue | H04N 5/44543 725/46 |
| 2010/0299601 | A1* | 11/2010 | Kaplan | G06F 15/16 715/716 |
| 2010/0318928 | A1* | 12/2010 | Neuman | G06F 3/0482 715/769 |
| 2012/0079419 | A1* | 3/2012 | Ajitomi | G06F 9/4443 715/781 |
| 2012/0166986 | A1* | 6/2012 | Trotta | G06F 3/0481 715/765 |
| 2012/0216143 | A1* | 8/2012 | Shiplacoff | G06F 3/0416 715/784 |
| 2012/0221971 | A1* | 8/2012 | Trotta | G06F 3/0482 715/803 |
| 2012/0221974 | A1* | 8/2012 | Trotta | G06F 3/0485 715/823 |
| 2012/0311623 | A1* | 12/2012 | Davis | H04N 5/765 725/18 |

FOREIGN PATENT DOCUMENTS

| | | |
|---|---|---|
| JP | 2005-062971 | 3/2005 |
| JP | 2008-167251 | 7/2008 |
| KR | 2001-0104677 | 11/2001 |
| KR | 10-2003-0067321 | 8/2003 |
| KR | 1004591940000 | 11/2004 |

(56) References Cited

FOREIGN PATENT DOCUMENTS

| KR | 2005-0058638 | 6/2005 |
|----|--------------|--------|
| KR | 2006-0033924 | 4/2006 |
| KR | 2006-0109381 | 10/2006 |

OTHER PUBLICATIONS

Korean Office Action dated Nov. 28, 2013 issued in KR Application No. 10-2007-0117095.
Non-Final Office Action dated Feb. 1, 2011 in parent U.S. Appl. No. 12/139,665.
Non-Final Office Action dated Jun. 10, 2011 in parent U.S. Appl. No. 12/139,665.
Final Office Action dated Jan. 3, 2012 in parent U.S. Appl. No. 12/139,665.
Non-Final Office Action dated Feb. 13, 2013 in parent U.S. Appl. No. 12/139,665.
Final Office Action dated Sep. 30, 2013 in parent U.S. Appl. No. 12/139,665.
Advisory Action dated Dec. 18, 2013 in parent U.S. Appl. No. 12/139,665.
Non-Final Office Action dated Jan. 29, 2014 in parent U.S. Appl. No. 12/139,665.
Final Office Action dated Aug. 15, 2014 in parent U.S. Appl. No. 12/139,665.
U.S. Appl. No. 12/139,665, filed Jun. 16, 2008, Kyoung Nyo Hwangbo et al., Samsung Electronics Co., Ltd., Suwon-si, KR.

* cited by examiner

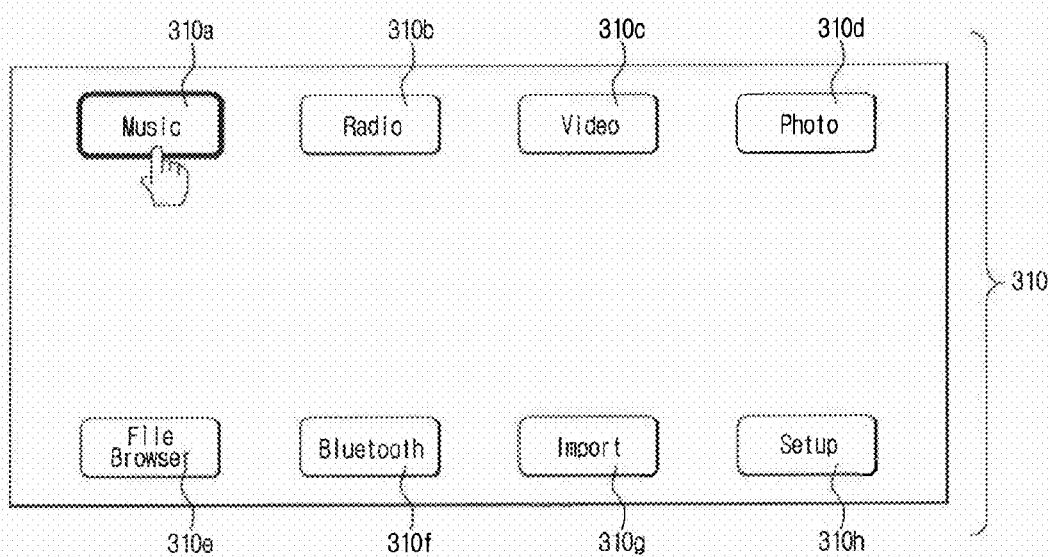

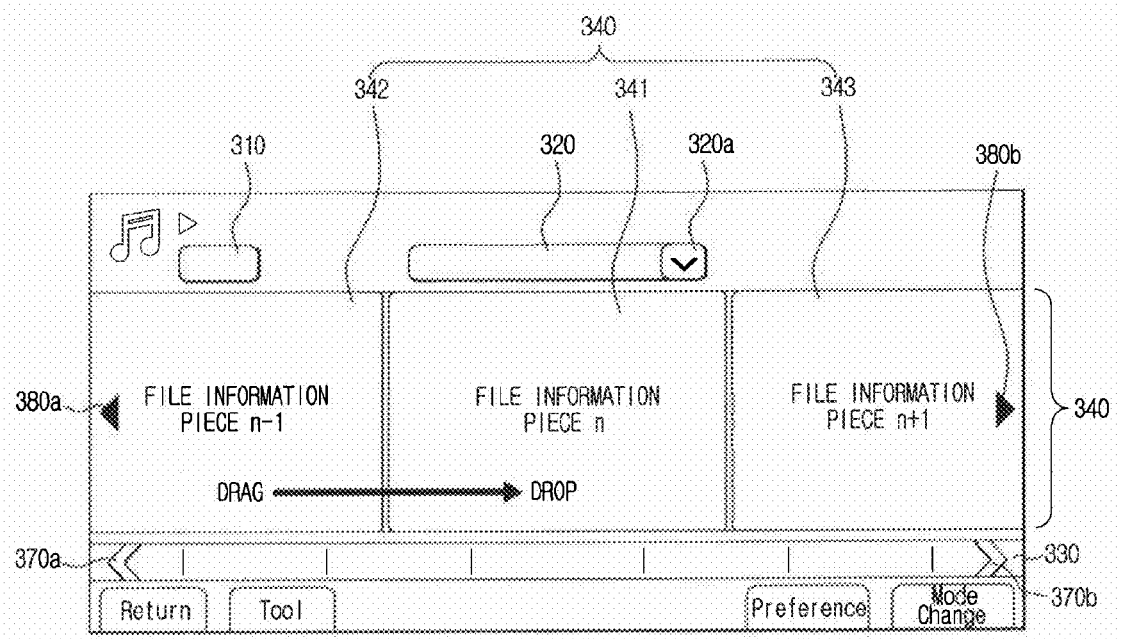

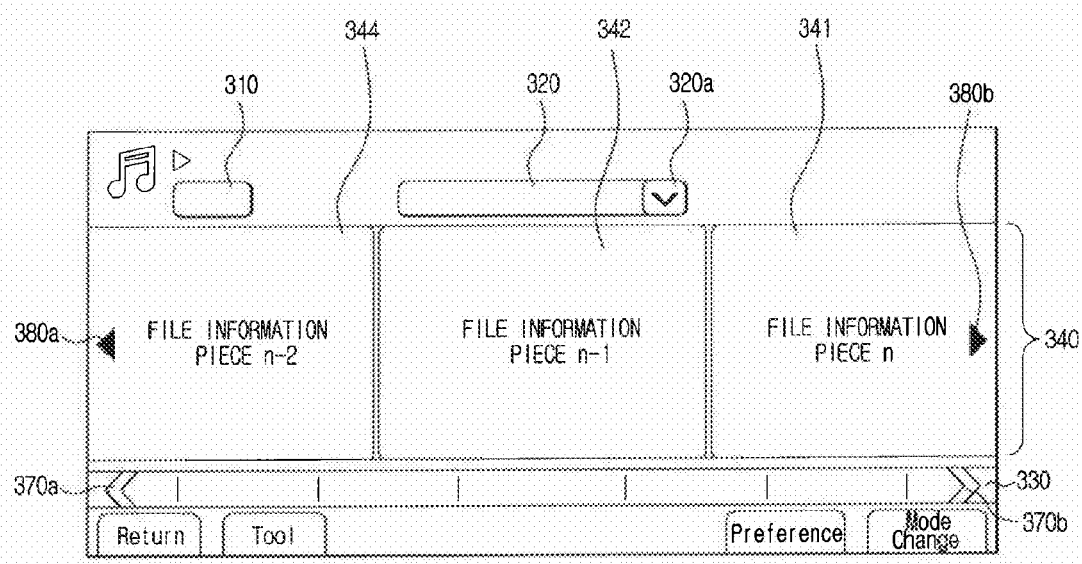

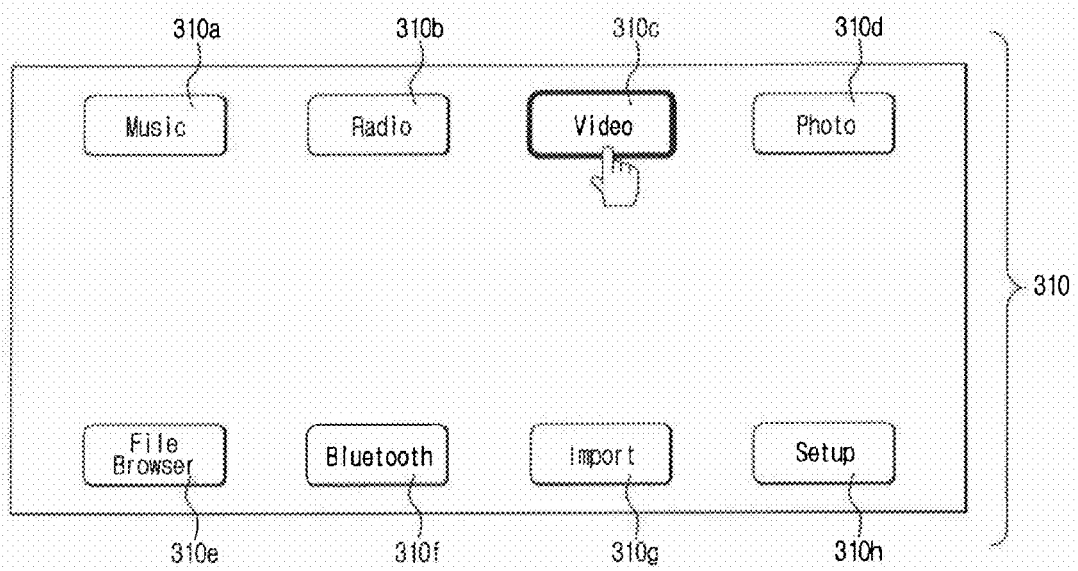

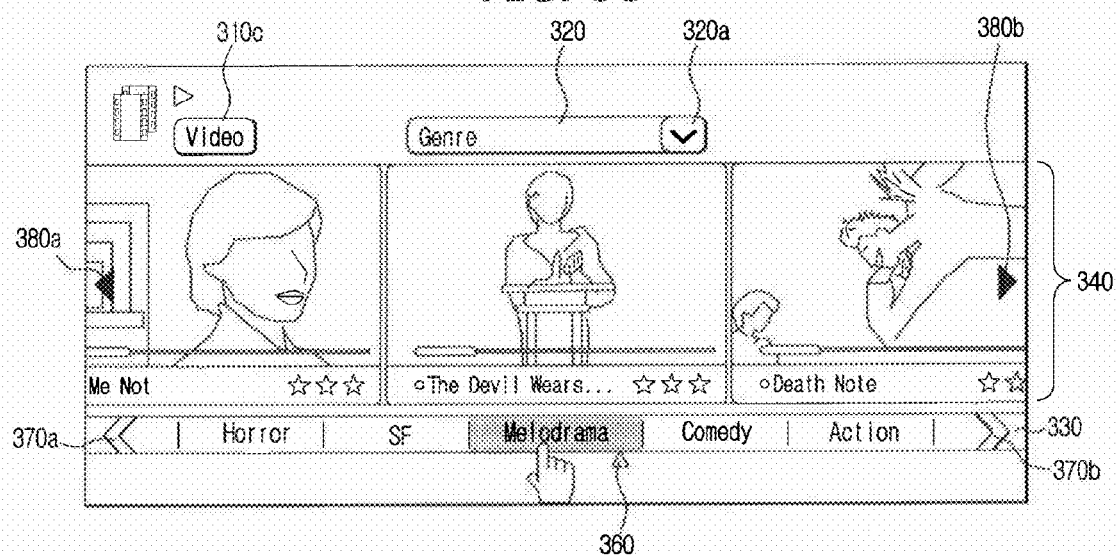

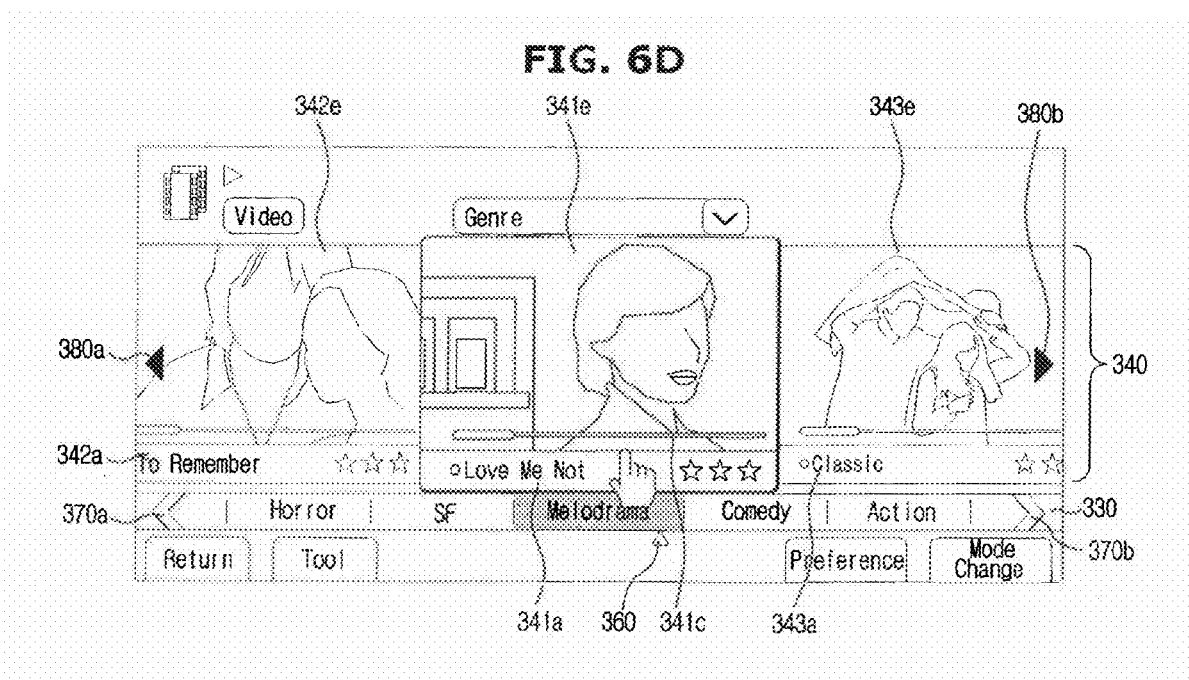

USER INTERFACE FOR DISPLAYING AND PLAYING MULTIMEDIA CONTENTS, APPARATUS COMPRISING THE SAME, AND CONTROL METHOD THEREOF

CROSS-REFERENCE TO RELATED APPLICATION

This is a Continuation Application of prior application Ser. No. 12/139,665, filed on Jun. 16, 2008 in the U.S. Patent and Trademark Office, which claims the benefit of Korean Application No. 10-2007-0117095, filed Nov. 16, 2007, in the Korean Intellectual Property Office, the disclosure of which is incorporated herein by reference.

BACKGROUND OF THE INVENTION

1. Field of the Invention

Aspects of the present invention relate to an apparatus for displaying and playing multimedia contents, and, more particularly, to a user interface for displaying and playing the multimedia contents, which is capable of allowing the user to easily recognize information about multimedia contents at a glance, and allowing the user to more easily retrieve desired information, through an image pre-play function, an apparatus comprising the same, and a control method thereof.

2. Description of the Related Art

In accordance with recent developments in the field of image and audio media, a recording medium capable of recording and storing a large amount of high-quality image data or high-quality audio data corresponding to a long playback time has been developed and are commercially available. Such a recording medium includes an optical disc, such as, a digital versatile disc (DVD), for example.

Also, an optical disc system capable of recording multimedia contents on an optical disc and playing the recorded multimedia contents has been developed and are commercially available. Such multimedia contents include images and audio, for example, and such an optical disc system includes a digital versatile disc (DVD) recorder, for example.

Such a DVD recorder plays back images and/or audio recorded on a DVD, and outputs the images and/or audio through a screen and/or a speaker. For multimedia contents consisting of moving images, the DVD recorder uses a coding compression algorithm proposed by the moving picture expert group (MPEG) to encode and record the multimedia contents. For the playback of the recorded multimedia contents, the DVD recorder decodes the encoded multimedia contents to reproduce original multimedia contents.

Personal video recorders (PVRs) have also been developed and are commercially available. Since such PVRs store a broadcast signal transmitted from a broadcasting station in a hard disk drive (HDD) or a storage medium other than the HDD in the form of a digital signal, it provides an environment enabling the user not only to view a broadcast of the broadcast signal in real time, but also to play back a stored broadcast signal every time the user wants to view a stored broadcast of the broadcast signal.

In typical cases, however, retrieval of a desired multimedia content can be achieved only after the user opens storage areas, namely, folders, in which the multimedia contents are stored one by one, because the multimedia contents are arranged in a form of a list.

In the typical multimedia content retrieval method, a number of operations performed to retrieve a desired multimedia content from the folder in which multimedia contents are stored increases as a depth (or a number of subfolders) of the folder increases. In order to retrieve a desired one of the multimedia contents, the user should search the multimedia contents stored in the subfolders one by one.

In the typical multimedia content retrieval method, in which listed multimedia contents are searched individually to retrieve a desired multimedia content, the searching operation is carried out only based on titles of the multimedia contents. In order to obtain detailed information about a certain multimedia content, it is necessary to actually play back the multimedia content. For this reason, it is inconvenient when the played-back multimedia content does not correspond to a multimedia content desired by the user, since search and retrieval operations would need to be repeated, possibly multiple times, to retrieve the desired multimedia content.

Furthermore, the recent increase in the capacities of the DVDs and the PVRs, and the recent continuous increase in the number of available multimedia contents have resulted in increased difficulty in searching an enormous amount of the multimedia contents.

SUMMARY OF THE INVENTION

Aspects of the present invention has been made in view of the above-mentioned problems, and an aspect of the invention include a user interface for displaying and playing multimedia contents, which is capable of allowing the user to easily recognize information about multimedia contents at a glance, and allowing the user to more easily retrieve desired information, through an image pre-play function, an apparatus comprising the same, and a control method thereof.

In accordance with one aspect of the present invention, a method of displaying and playing multimedia contents includes displaying a sorting item of a multimedia content; and arranging file information of the multimedia content based on the sorting item, the file information having a form of a playable image and having a pre-play function.

According to an aspect of the present invention, the method may further include displaying the file information in an activated state when the file information is selected using the sorting item.

According to an aspect of the present invention, the displaying of the sorting item of the multimedia content may include: displaying a main item of the multimedia content; displaying an upper-level item as a sub-item of the main item when the main item is selected; and displaying a lower-level item as a sub-item of the upper-level item when the upper-level item is selected.

According to an aspect of the present invention, the displaying of the file information in the activated state may include: further displaying an indicator to indicate a position of the activated file information relative to the other file information.

According to an aspect of the present invention, the arranging of the file information may include: further displaying a moving bar to move a position of the arranged file information relative to the other file information.

According to an aspect of the present invention, the file information may be arranged in the form of a playable thumbnail.

In accordance with another aspect of the present invention, a method for displaying and playing multimedia contents includes displaying a sorting item of a multimedia content; arranging file information of the multimedia content based on the sorting item, the file information having a form of a playable image and having a pre-play function; and pre-playing a file corresponding to the file information when the file information is selected, wherein the pre-playing of the file includes stopping the pre-play of the file when a file stop command for the file is input, and resuming the pre-play of the file, resuming from a stop point at which the pre-play of the file was stopped, when a file return command is input.

According to an aspect of the present invention, the pre-playing of the file may further include storing the stop point of the file in response to the file stop command.

In accordance with another aspect of the present invention, an apparatus for displaying and playing multimedia contents includes an input unit to receive a selection of a sorting item of a multimedia content; and a controller to arrange file information of the multimedia content based on the sorting item, the file information having a form of a playable image and having a pre-play function.

According to an aspect of the present invention, the controller may display the file information in an activated state when the file information is selected using the sorting item.

According to an aspect of the present invention, the controller may control display of a main item of the multimedia content. The controller may control display of an upper-level item as a sub-item of the main item when the main item is selected. The controller may control display of a lower-level item as a sub-item of the upper-level item when the upper-level item is selected.

According to an aspect of the present invention, the controller may further control display of an indicator bar to indicate a position of the activated file information relative to the other file information.

According to an aspect of the present invention, the controller may further control display of a moving bar to move a position of the arranged file information relative to the other file information.

In accordance with another aspect of the present invention, an apparatus for displaying and playing multimedia contents includes an input unit to receive selection of a sorting item of a multimedia content; and a controller to arrange file information of the multimedia content based on the sorting item, the file information having the form of a playable image and having a pre-play function, and to pre-play a file corresponding to the file information when the file information is selected, wherein the controller stops the pre-play of the file when a file stop command for the file is input, and resumes the pre-play of the file, resuming from a stop point at which the pre-play of the file was stopped, when a file return command is input.

According to an aspect of the present invention, the apparatus may further include a storage unit to store the stop point of the file in response to the file stop command.

In accordance with another aspect of the present invention, a user interface for displaying and playing multimedia contents includes at least one upper-level item arranged at an upper portion of the user interface; at least one lower-level item arranged at a lower portion of the user interface, to represent at least one sub-item of the at least one upper-level item; and a plurality of file information pieces having a pre-play function arranged at a central portion of the user interface, wherein the upper-level item represents a sorting item of the multimedia contents, and each of the file information pieces provides additional information about an associated one of files of the multimedia contents, and is activated upon being selected by a user.

According to an aspect of the present invention, the user interface may further include a first moving bar to move the at least one lower-level item in left and right directions.

According to an aspect of the present invention, the user interface may further include a second moving bar to move the file information pieces in left and right directions.

According to an aspect of the present invention, a method of confirming a content of multimedia contents includes: displaying menu items selectable to obtain one or more playable thumbnails corresponding to the multimedia contents; displaying one or more of the playable thumbnails obtained via a selection of the menu items; and pre-playing a content of a multimedia content corresponding to a selected one of the one or more playable thumbnails to confirm the content thereof.

According to an aspect of the present invention, an apparatus to reproduce multimedia contents includes: a display to display a graphic user interface; and a controller to control display of the graphic user interface to: selectively display menu items selectable to obtain one or more playable thumbnails corresponding to the multimedia contents, display one or more of the playable thumbnails obtained via a selection of the menu items, and pre-play a content of a multimedia content corresponding to a selected one of the one or more playable thumbnails to confirm the content thereof.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the aspects, taken in conjunction with the accompanying drawings of which:

FIGS. 3A to 3D are views illustrating images displayed for a multimedia content of music in accordance with an aspect of the present invention;

FIGS. 4A and 4B are views illustrating drag and drop operations for file information pieces;

FIGS. 6A to 6D are views illustrating screen images displayed for a multimedia content of video in accordance with an aspect of the present invention;

DETAILED DESCRIPTION OF THE EMBODIMENTS

Figure 1:
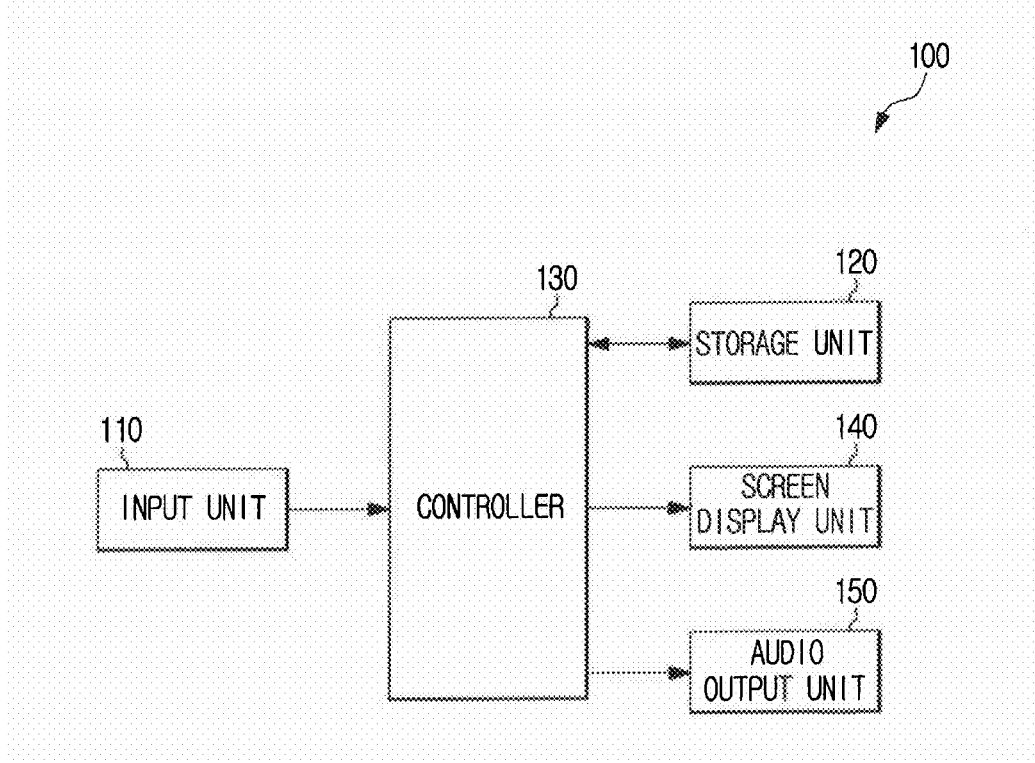
FIG. 1 is a block diagram illustrating an apparatus for displaying and playing multimedia contents in accordance with an aspect of the present invention.

Reference will now be made in detail to aspects of the present invention, examples of which are illustrated in the accompanying drawings, wherein like reference numerals refer to the like elements throughout. The aspects are described below in order to explain the present invention by referring to the figures.

FIG. 1 is a block diagram illustrating an apparatus for displaying and playing multimedia contents in accordance with an aspect of the present invention. As shown in FIG. 1, the multimedia content displaying and playing apparatus 100 includes an input unit 110, a storage unit 120, a controller 130, a screen display unit 140, and an audio output unit 150.

The multimedia content displaying and playing apparatus 100 is an apparatus which is equipped with a digital circuit to process digital data, while having a function to display and play images and/or audio through a screen (for example, of the screen display unit 140) and/or a speaker (for example, of the audio output unit 150). Examples of the multimedia content displaying and playing apparatus 100 include a computer, a printer, a digital TV, a digital camera, a digital copying machine, a personal digital assistant (PDA), a mobile phone, a portable multimedia player (PMP), an MP3 player, a digital video recorder, or other devices. Hereinafter, constituent elements of the multimedia content displaying and playing apparatus 100 will be described in detail with reference to FIG. 1.

The input unit 110 receives inputs representing sorting items of a multimedia content selected to be played back from among a plurality of multimedia contents. In aspects of the present invention, sorting items refers to information that is used to sort, classify, identify, distinguish, and/or select the multimedia contents. For example, the input unit 110 receives a main item for a selection of a kind of a multimedia content (for example, music, video, radio, or photograph). The input unit 110 also receives an upper-level item as a sub-item of the main item to further sort or distinguish the main item.

For example, where the main item is music, the upper-level item may include genre, preference, album, and/or artist of the music. In aspects of the present invention, preference refers to a user's characterization, affinity, or a user generated item category for the main item. On the other hand, where the main item is video, the upper-level item may include genre, preference, or actor, for example.

The input unit 110 further receives a lower-level item as a sub-item of the upper-level item. For example, where the upper-level item in the main item "music" is genre, the lower-level item thereof may include pop, ballad, jazz, or rock, for example. On the other hand, where the upper-level item in the main item "video" is genre, the lower-level item may include melodrama, horror, action, science fiction (SF), etc. Also, the input unit 110 receives file information selected to be executed from among playable file information pieces included in the lower-level item.

Preferably, selection of the sorting items of the multimedia contents to be played back are directly input to the input unit 110 by an operation of the user through a keyboard, a touch screen, a mouse, a track ball, or a keypad on a PDA, for example. The input unit 110 may receive the selection of the sorting items through a remote controller equipped with direction buttons and/or numeral buttons in other aspects.

Although the sorting items are described as including three items, namely, a main item, an upper-level item, and a lower-level item, in the illustrated aspect, such is not required. That is, various kinds and various numbers of items may be selected as sorting items, or included in the sorting items, in accordance with various structures, characteristics, and capacities of the multimedia content displaying and playing apparatus 100.

The storage unit 120 stores sorting items each sorted as a main item, an upper-level item, or a lower-level item. The storage unit 120 also stores a plurality of file information pieces, playable files, and/or pre-playable files which indicated as another type of file information. Here, the "pre-playable file" refers to a scale-reduced playable file produced based on an original playable file through an editing or a reduction in the scale of the original playable file. In aspects of the present invention, a scale refers to a size and/or a length. The storage unit 120 also stores a stop point of the pre-playable file when a playback of a pre-playable file is stopped during the playback of the pre-playable file.

The storage unit 120 may also be a module which can input and output information. Examples of the storage unit 120 include a hard disk, a flash memory, a compact flash (CF) card, a secure digital (SD) card, a smart media (SM) card, a multimedia (MMC) card, and a memory stick. The storage unit 120 may be equipped in the multimedia content displaying and playing apparatus 100, or may be equipped in a separate device.

Hereinafter, various functions of the controller 130 will be discussed. The controller 130 controls a display of the sorting items through a screen display unit 140. In detail, the controller 130 controls the display of the main item and the corresponding sub-item of multimedia contents to be played back. For example, when the displayed main item is selected, the controller 130 displays the sub-item of the selected main item, namely, the upper-level item. When the displayed upper-level item is selected in turn, the controller 130 displays the sub-item of the selected upper-level item, namely, the lower-level item.

The controller 130 also arranges and controls the display of a plurality of file information pieces included in the displayed sorting items. That is, the controller 130 controls display of a plurality of file information pieces corresponding to the displayed sorting items in a form of arranged playable thumbnails. The controller 130 also controls display of a title and additional information of each file information piece. For an audio file information piece, the additional information thereof may include information as to an artist, an album, a genre, and a preference of the audio file. For video file information piece, the additional information thereof may include information as to a character, a genre, and a preference of the video file. In aspects of the present invention, each playable thumbnail presents a plurality of file information for a multimedia content in a compact format, and includes a title, one or more images, and the like. The playable thumbnails play at least a portion of corresponding multimedia contents, which is referred to as a pre-play function. The playable thumbnails may be of video, audio, or other multimedia files.

When at least one of the file information pieces is selected, the controller 130 controls display of the selected file information piece in an activated state, while controling the display of the file information pieces that are arranged adjacent to the selected file information piece in an inactive or an inactivated state. In this case, the number of file information pieces displayed in the form of the playable thumbnails may be varied in accordance with a size of the screen display unit 140 equipped in the multimedia content displaying and playing unit 100, or other factors.

The controller 130 also controls display of an indicator 360 (FIGS. 3C and 3D), in order to indicate a position of the activated file information piece within a continuum of file information pieces. The user can change the position of the indicator 360 by touching and dragging the indicator 360. The user can also change the position of the indicator 360 by touching a selected one of the displayed lower-level items 330 to move the indicator to the touched position.

The controller 130 also moves the position of the file information piece in accordance with a command to move the file information when the command is input or received. In this case, the position of the indicator 360 is also changed in accordance with the moved file information piece.

The controller 130 also controls a change in positions of the file information pieces in accordance with a touch, drag, or stroke operations. For example, in a case of a touch screen, when the user touches the file information piece that may be displayed as a third thumbnail from the right (see FIGS. 4A and 4B), the third file information piece may be moved to a central area where the file information will be activated. Further, the user can repeat the touch and drag operation on the third file information piece to again move the third file information from the central area to a position of the first file information piece. Further, using a stroke operation, it is also possible to rapidly move a plurality of file information pieces as a group (see FIGS. 5A and 5B).

Meanwhile, when at least one of the file information pieces is selected, the controller 130 controls pre-play of the file represented by the selected file information piece. Then, during the pre-play of the file, if a file stop command is input or received, the controller 130 stops the pre play of the file at that stop point. When a file return command is subsequently input or received, the controller 130 resumes the pre-play of the file, resuming from the stop point of the file.

On the other hand, during the pre-play of a file (referred to as a former file), if the controller 130 receives a request for execution of another file (referred to as a latter file), the controller 130 stops the pre-play of the former file, and stores the stop point of the former file in the storage unit 120. Subsequently, the controller 130 executes the latter file, displays the latter file, and pre-plays the latter file. When a user desires to resume the pre-play of the former file, the user inputs a command for the controller 130 to resume the pre-play of the former file, resuming from the stop point of the former file.

Additionally, the controller 130 respectively provides progressive bars on the file information pieces displayed in the form of the playable thumbnails to indicate progress of the pre-play, for example. For multimedia contents (or files) associated with music, the controller 130 also controls to provide a resume function for an associated file information piece. For sake of illustration, in accordance with the resume function, when the user listening to a song while checking additional information about the song retrieves another song to listen, and subsequently resumes the pre-play of the song, the pre-play of the song can be resumed from a point where the pre-play of the song was stopped.

For multimedia contents (or files) associated with videos, the controller 130 provides a pre-play function in various ways. For example, the controller 130 may provide the pre-play function by playing only a portion of the file. In this case, a starting point of the pre-play of the multimedia contents may be a point of the multimedia contents that jumped (or skipped) a certain percentage of an overall length of the multimedia contents (for example, 10%), taking into consideration a fact that most commercially available multimedia content, such as video files have an opening part consisting of a black image and/or a promotional image (or advertisement) associated with a studio or a producer of the video.

For multimedia contents (or files) associated with videos, again the controller 130 also provides a resume function where the user, while viewing one video, retrieves another video to view a latter video, and subsequently resumes the pre-play of the one video, the pre-play of the one video can be resumed from a point where the pre-play of the one video was stopped.

Referring back to FIG. 1, the screen display unit 140 refers a device capable of outputting images corresponding to image data. Examples of the screen display unit 140 include a liquid crystal display (LCD), a plasma display panel (PDP), a thin film transistor-liquid crystal display (TFT-LCD), an organic electro-luminescence display (OELD), an organic light emitting diode (OLED) display, and a cathode ray tube (CRT). Where the screen display unit 140 is of a touch screen type, the screen display unit 140 can implement both the function of an output unit to output images corresponding to the image data and the function of an input unit to receive a command input from the user.

The audio output unit 150 refers to a device capable of outputting audio data represented by a file information piece. An example of the audio output unit 150 includes a speaker.

Figure 2:
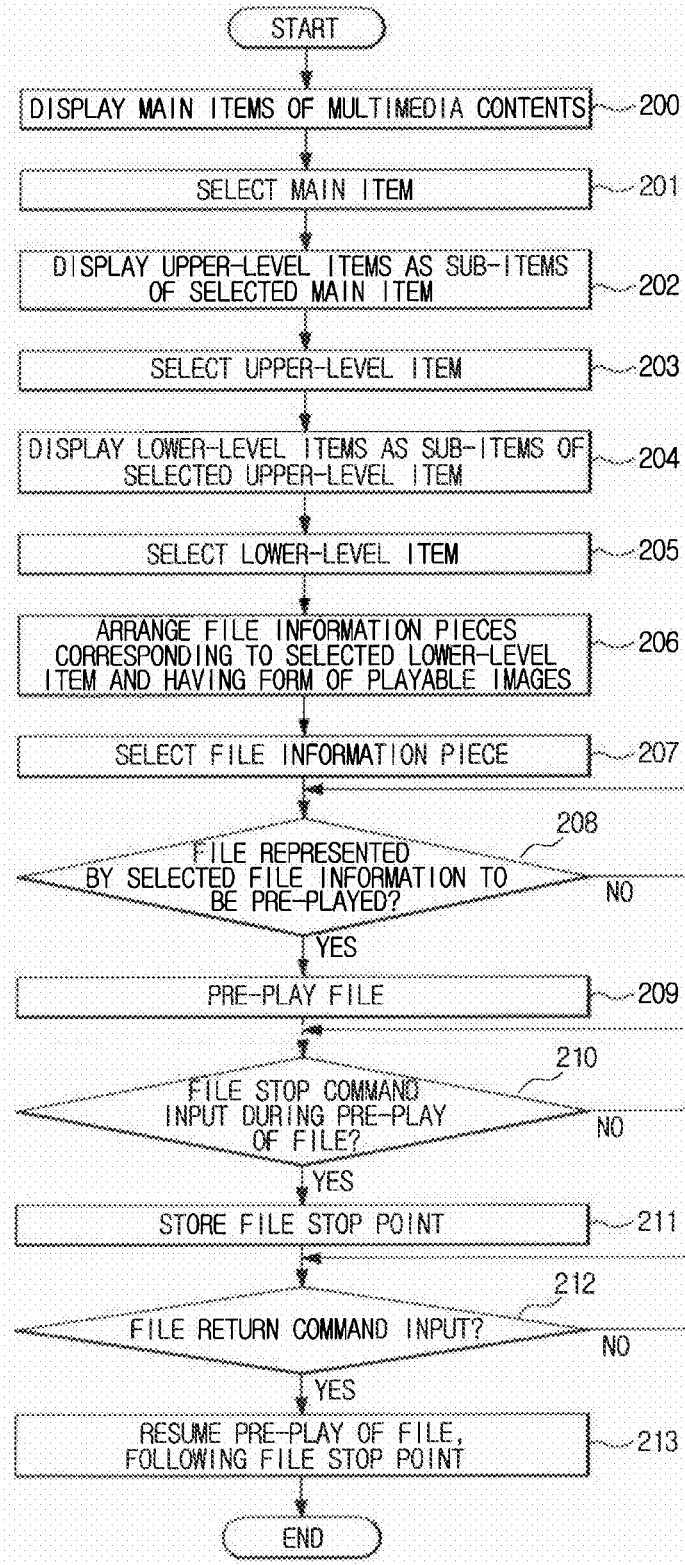
FIG. 2 is a flow chart for explaining a control procedure for the multimedia content displaying and playing apparatus in accordance with an aspect of the present invention.
Figure 5A:
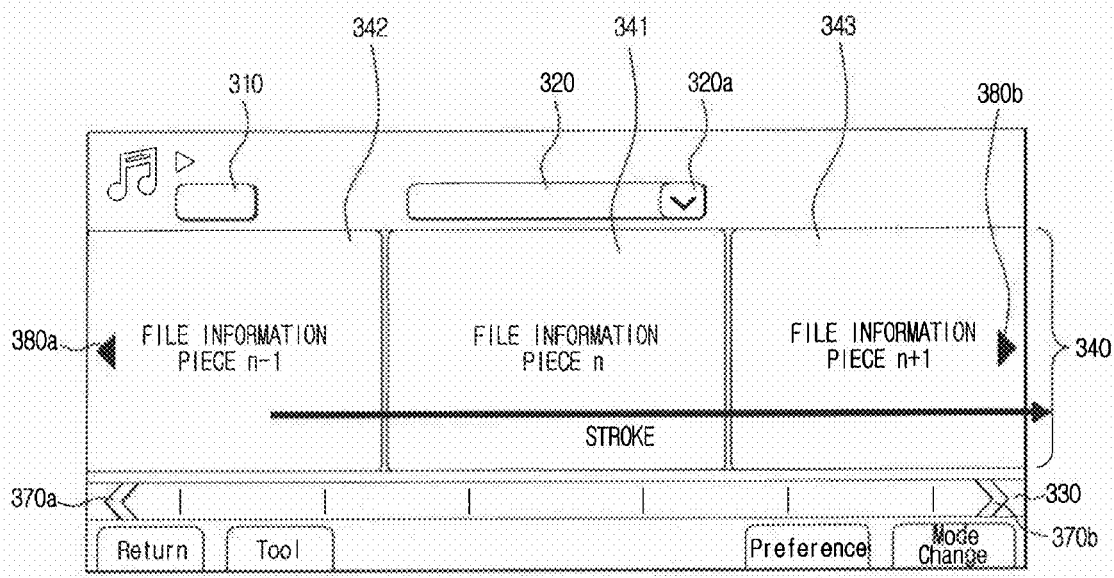
FIGS. 5A and 5B are views illustrating a stroke operation for file information pieces.
Figure 5B:
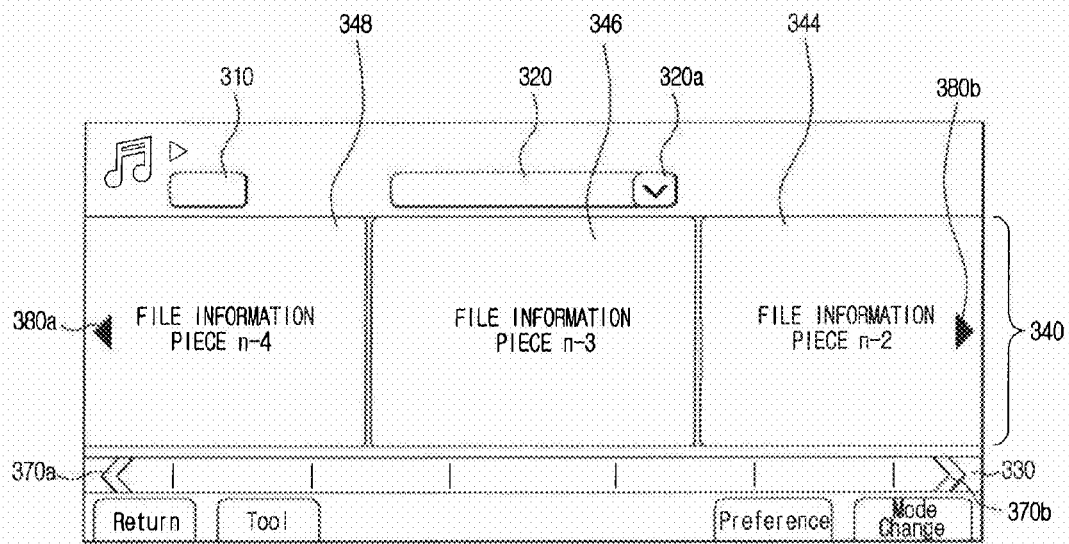

Hereinafter, operations, functions, and effects of a user interface having the above-described configuration to display and play multimedia contents, an apparatus including the same, and a control method thereof will be described with reference to FIGS. 2, 3A-3D, 4A-4B, and 5A-5B. FIG. 2 is a flow chart for explaining a control procedure for a multimedia content displaying and playing apparatus in accordance with an aspect of the present invention. FIGS. 3A to 3D are views illustrating images displayed for a multimedia content of music in accordance with an aspect of the present invention. FIGS. 4A and 4B are views illustrating drag and drop operations for file information pieces. FIGS. 5A and 5B are views illustrating a stroke operation for file information pieces;

In accordance with the control procedure, main items 310 of multimedia contents are first displayed (operation 200). In detail, as shown in FIG. 3A, the main items 310 of multimedia contents, for example, items "music" 310*a*, "radio" 310*b*, "video" 310*c*, "photo" 310*d*, "file browser" 310*e*, "bluetooth" 310*f*, "import" 310*g*, and "setup" 310*h*, are displayed through the screen display unit 140, which is a user interface (i.e., a touch screen) in this aspect of the present invention.

Figure 3B:
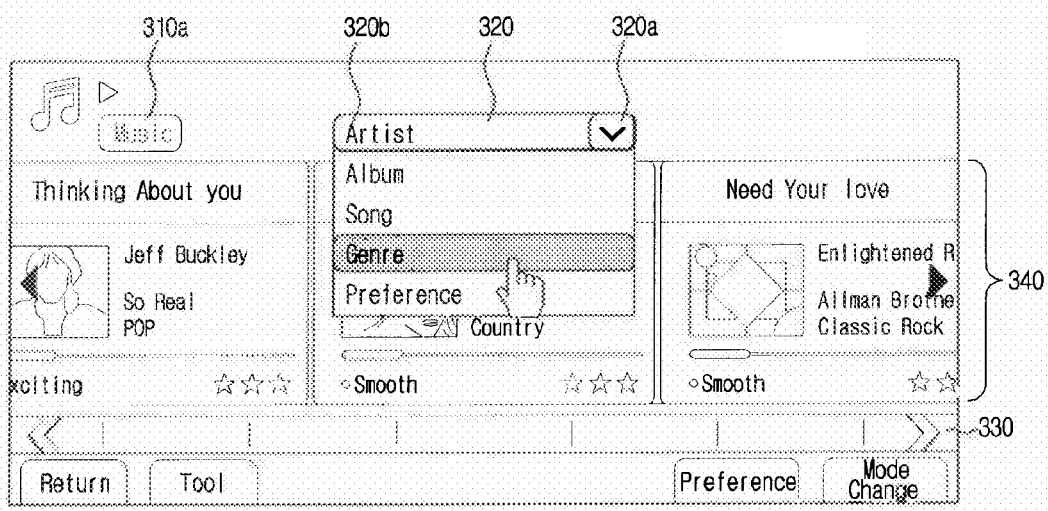

When the user selects a main item corresponding to a file to be executed from among the main items 310, namely, the item "music" 310*a*, as shown in FIG. 3A, the sub-item of the selected main item 310, namely, an upper-level item 320, is displayed, as shown in FIG. 3B. The displayed upper-level item 320 is arranged at an upper screen portion of the screen display unit 140. At least one upper-level item may be displayed. The displayed upper-level item 320 includes a section bar 320*a* positioned at the right side of the displayed upper-level item 320. If a downward-arrow shape of the section bar 320*a* is selected, a plurality of upper-level items are displayed in a downwardly-arranged state.

When the user selects one of the upper-level items from among the downwardly-arranged upper-level items, a bar 320*b* of the upper-level item 320 of the selected main item 310 is moved to the selected upper-level item as shown in FIG. 3B. With the movement of the bar 320*b*, and a selection of one of the main item 320, file information 340 and lower-level items 330 are also changed to correspond to the selected upper-level item 320, as shown in FIG. 3C.

To illustrate in detail, the selected main item 310 corresponds to the item "music" 310a is selected in FIG. 3A, and the displayed upper-level items 320 as the sub-items corresponding to the item "music" 310a, are items "artist", "album", "song", "genre", and "preference", for example.

When the user selects the item "genre" as an upper-level item 320 (operation 203 and FIG. 3B), lower-level items 330 that corresponds to the item "genre" are displayed. For example, the lower-level items 330 that corresponds to the item "genre" may be items "classic", "jazz", "pop", and "ballad", as shown in FIG. 3C (operation 204). The displayed lower-level items 330 are arranged at a lower screen portion of the screen display unit 140. At least one lower-level item may be displayed.

Figure 3C:
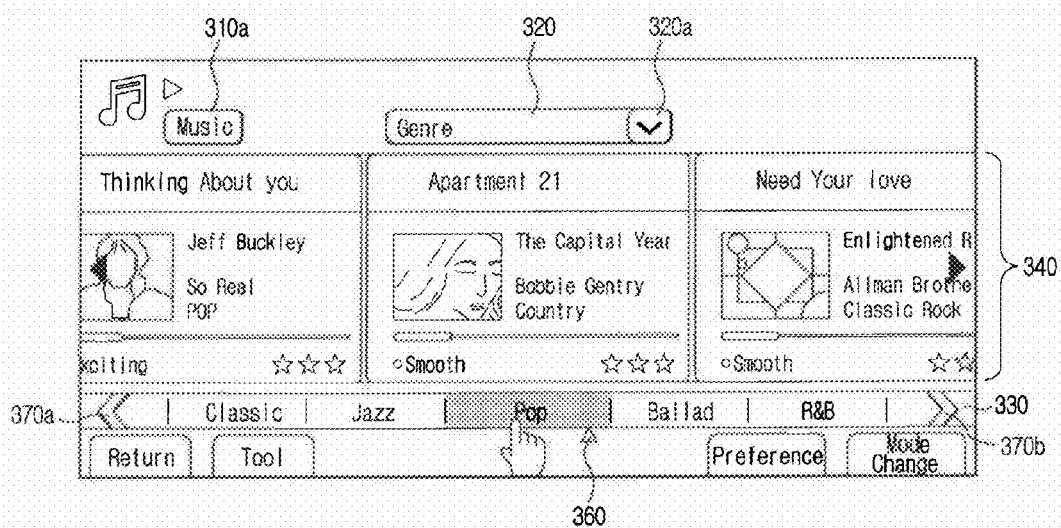
Figure 3D:
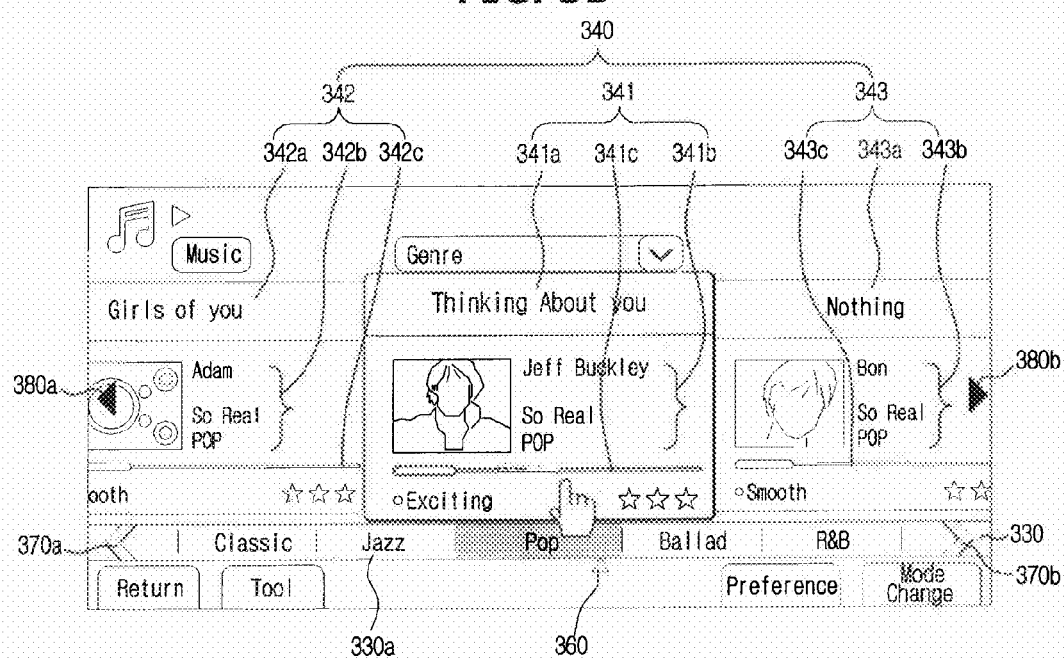

As shown in FIG. 3C and 3D, first moving bars 370a and 370b are also displayed at opposite sides of areas 330a where the lower-level items 330 are displayed. Accordingly, when one of the first moving bars 370a and 370b is selected, an additional item 330, for example, an item "rock" (not shown), which previous has not been displayed, can be displayed.

When the user selects one of the displayed lower-level items 330 (operation 205), file information pieces, which correspond to the selected lower-level item 330, and having the form of images, are arranged, as shown in FIG. 3D (operation 206). The file information pieces 340 are arranged at a central screen portion of the screen display unit 140, in the form of playable thumbnails.

The file information pieces 340 displayed in the form of playable thumbnails, for example, file information pieces 341, 342, and 343, include respective titles 341a, 342a, and 343a, and additional information 341b, 342b, and 343b each including an album image and information about an artist, an album, a genre, and a preference. As shown in FIGS. 3C and 3D, the preference refers to a user's characterization of the file information, such as, "smooth" and "exciting".

As shown in FIG. 3B-3D, and as referenced in FIG. 3D, second moving bars 380a and 380b are also displayed at opposite sides of an area where the displayed file information pieces 340 are displayed. Accordingly, when one of the second moving bars 380a and 380b is selected, additional file information pieces 340, which have not been previously displayed, can be displayed or come into view. For example, when the left second moving bar 380a is selected, the displayed file information pieces 340 all move in a left direction, and previously non-displayed file information pieces 340 can be displayed on the screen display unit 140 from the right. On the other hand, when the right second moving bar 380b is selected, the displayed file information pieces 340 all move in a right direction, and previously non-displayed file information pieces 340 can be displayed on the screen display unit 140 from the left.

With reference to FIGS. 4A, 4B, 5A, and 5B, the controller 130 can also change positions of displayed file information pieces 340 in accordance with a touch, drag, or stroke operations. When the user drags a selected one of the file information pieces 340, for example, a file information piece "n−1" 342, to a position of file information piece "n" 341 arranged at the right side of the file information "n−1" 342 by one column, and then drops the dragged file information piece "n−1" 342 at the position of the file information piece "n" 341, as shown in FIG. 4A, the file information piece "n−1" 342 is moved to the position previously occupied by the file information piece "n" 341, as shown in FIG. 4B.

On the other hand, when the user performs a stroke operation to move the file information piece "n−1" 342 to a position corresponding to a file information piece "n+2" (not shown) arranged at the right side of the selected file information piece "n−1" 342 by three columns, as shown in FIG. 5A, the file information piece "n−1" 342 is moved to the position of previously occupied by the file information piece "n+2", and moves out of view. In this case, a file information piece "n−4" 348 will become positioned at the previous position of the file information "n−1" 342, as shown in FIG. 5B.

That is, when the user selects the file information piece 342 displayed as a third playable thumbnail from the right, as shown in FIG. 4A, and the file information piece 342 is moved to a central area, then the file information piece 342 is activated. Further, the file information piece 342 can again be selected and dragged from the central area to the position of the first file information piece 343. Moreover, by using a stroke operation, it is possible to rapidly move a plurality of file information pieces by relatively large amounts or many slots.

When the user selects a desired one of the file information pieces 341 (operation 207), the selected file information piece 341 is displayed in an activated state. At this time, the non-selected file information pieces 342 and 343 arranged adjacent to the selected file information piece 341 are displayed in an inactive or an inactivated state. Preferably, the activated file information piece 341 is displayed in an emphasized state, as compared to the inactive or inactivated file information pieces 342 and 343. In order to indicate the position of the activated file information piece within a plurality of lower level items, an indicator 360 is also displayed. In aspects of the present invention, an emphasized state includes being in an enlarged state, a changed color state, or otherwise a different state from an deemphasized state so as to distinguish ones in the emphasized state from ones that are not in the emphasized state.

In aspects of the present invention, the controller 130 can change the file information piece to be activated by moving the indicator 360 or the position thereof in accordance with a command input from the input unit 110. For example, where the multimedia content displaying and playing apparatus 100 is of a touch screen type, the user can move the indicator 360 by touching (namely, selecting) and dragging the indicator 360 to a new position along a certain portion of an area (or a strip) where lower-level items 330 are arranged. Also, the user can also change the position of the indicator 360 by touching (selecting) a selected one of the displayed lower-level items 330. That is, when the user touches a certain portion of an area where lower-level items 330 are arranged, the indicator 360 is shifted to a position corresponding to the touched area portion. In aspects of the present invention, the movement and/or repositioning of the indicator 360 is performed by controlling a cursor.

When the position of the indicator 360 is changed in a touch or drag manner, the file information piece to be activated is also changed in accordance with the changed position of the indicator 360. That is, a file information piece corresponding to the new positioning of the indicator 360 is activated while an file information piece corresponding to the previous positioning of the indicator 360 may be inactivated.

Thereafter, the controller 130 determines whether the file represented by the selected file information piece is to be pre-played (operation 208). If yes, the controller 130 plays back (or reproduces) the file (operation 209). That is, the controller 130 provides a progressive bar 341c, 342c, or 343c (FIG. 3D) on the selected file information piece 341, 342, or 343, to support the pre-play function. The user may click and drag on the progressive bar or an indicator thereon, to change a playback position of the file.

In aspects of the present invention, the user may double click the progressive bar to play back the file all over again. For the pre-play of the selected file, a corresponding and separate pre-playable file stored in the storage unit 120 may be played back. Alternatively, the actual file stored in the storage unit 120 may be played back, only for a predetermined time (for example, 15 seconds).

The determination of whether the selected file is to be played back is determined by whether the playback operation has been optionally set to an automatic mode or a manual mode, and determining whether a pre-play command from the user has been input if the playback operation has been set to the manual mode. In aspects of the present invention, the user may input the pre-play command, using a remote controller. Alternatively, if set to the manual mode, the user may input the pre-play command using a pre-play button provided on the selected file information piece, or by a button on the multimedia content displaying and playing apparatus 100.

Subsequently, the controller 130 determines whether a file stop command is input during the pre-play of the selected file (operation 210). When the file stop command is input, the controller 130 stores the stop point of the selected file in the storage unit 120 (operation 211). Preferably, the stop point includes information as to a time (or a length) for which the file was played back.

The controller 130 then determines whether a file return command for the play-stopped file is input. Namely, controller 130 determines whether the play-stopped file is to be again played back (operation 212). When the file return command is input, the controller 130 resumes the pre-play of the file, resuming from the stop point (operation 213).

That is, when the pre-play of one file is stopped for the playback of another file, and the file return command is subsequently input during the playback of the another (latter) file, to activate the former file, in order to resume the pre-play of the one file (former) file, the controller 130 retrieves the stop point of the former file, and plays back the former file, resuming from the stop point.

Figure 6B:
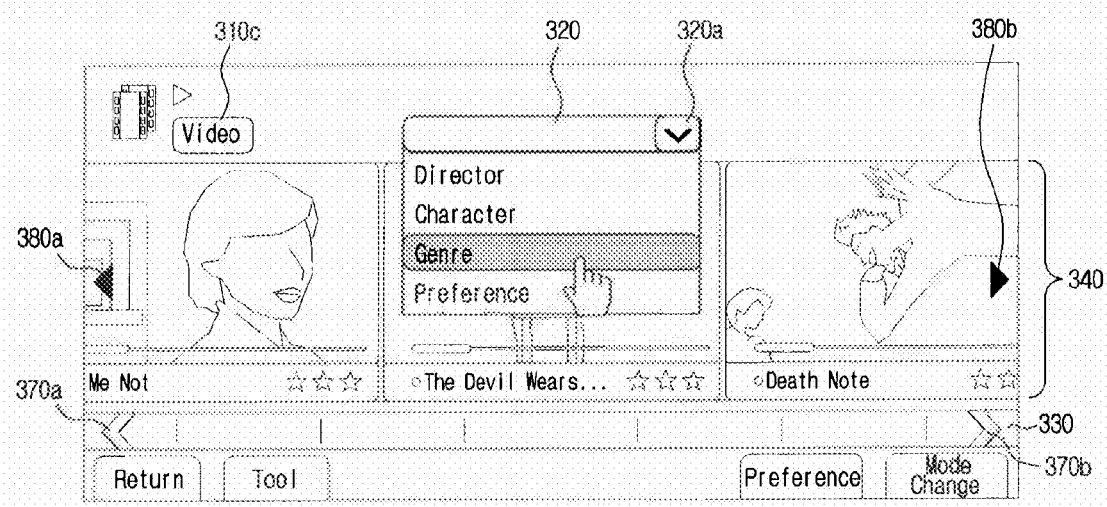

FIGS. 6A to 6D are views illustrating screen images that are displayed when the multimedia content to be played back is video, in accordance with an aspect of the present invention. As shown in FIG. 6A, the main items 310 of multimedia contents, for example, items "music" 310a, "radio" 310b, "video" 310c, "photo" 310d, "file browser" 310e, "bluetooth" 310f, "import" 310g, and "setup" 310h, are displayed through the screen display unit 140.

When the user selects the item "video" 310c from among the main items 310, as shown in FIG. 6A, the sub-items of the item "video" 310c, namely, upper-level items 320, are displayed, as shown in FIG. 6B. Thereafter, when the user selects the item "genre" as a desired upper-level item 320, corresponding lower-level items 330, for example, items "melodrama", "horror", "action", and "science fiction (SF)", are displayed as sub-items of the item "genre", as shown in FIG. 6C.

When the user selects the item "melodrama" as a desired lower-level item 330, file information pieces (or playable thumbnails) 340, which correspond to the item "melodrama" having a form of playable images, are arranged, as shown in FIG. 6D. When the user selects one file information piece to be executed from among the arranged file information pieces 340, for example, the file information piece 341, the selected file information piece 341 is activated, whereas the file information pieces 342 and 343 arranged adjacent to the file information piece 341 remain inactive or are inactivated. As shown, the activation of the selected file information piece 341 is shown by a scale change, and is shown as file 341e.

That is, the file information pieces 341, 342, and 343 include files 341e, 342e, and 343e, respectively. The corresponding file of the activated file information piece, for example, the file 341e of the file information piece 341 is pre-played, to provide information about the file to the user.

Hereinafter, a method for providing additional services or functionalities to the user, using a plurality of additional buttons or tabs 350 arranged at a lower end of the user interface will be described. First, a method enabling the user to directly search for a desired file, without using the retrieval method involving the sorting items of multimedia contents, will be described.

Figure 7A:
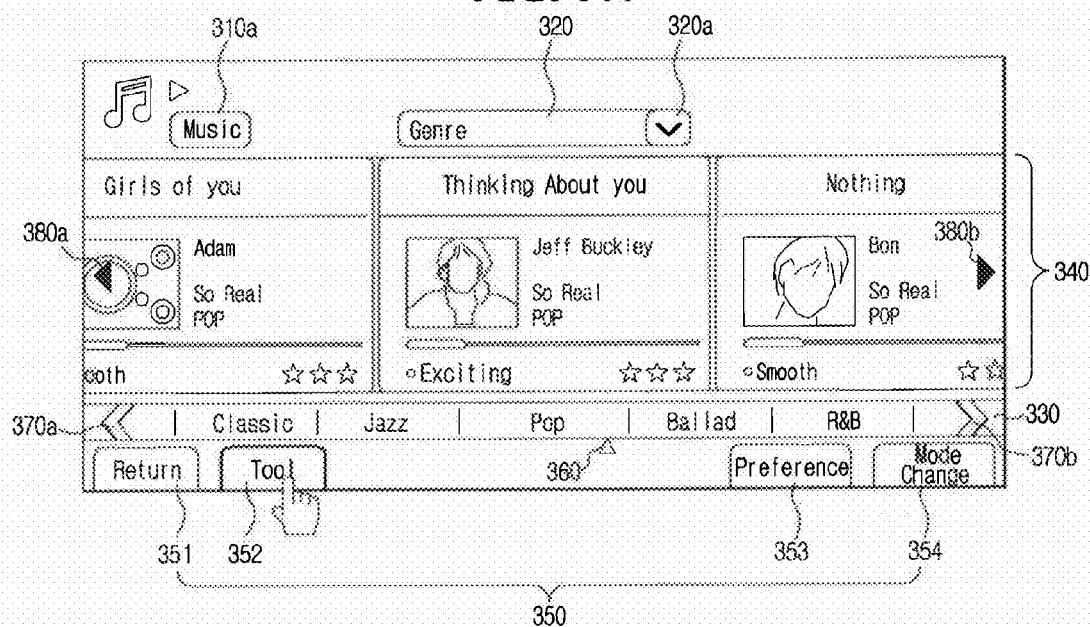
FIGS. 7A and 7B are views illustrating screen images displayed when a tool button is selected in accordance with an aspect of the present invention.
Figure 7B:
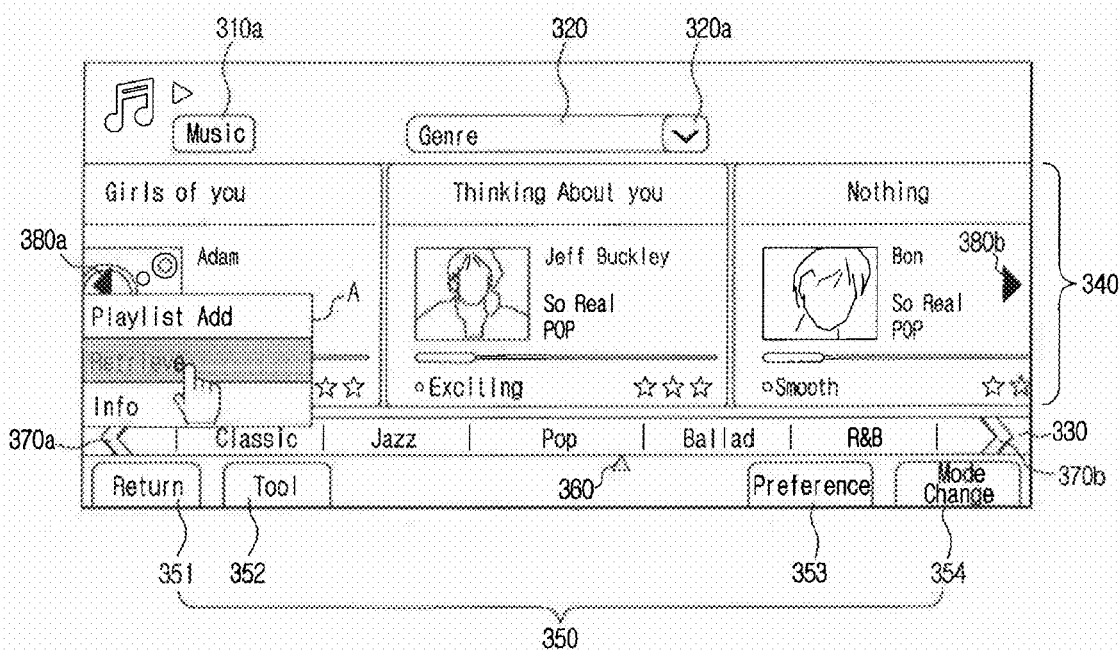
Figure 7C:
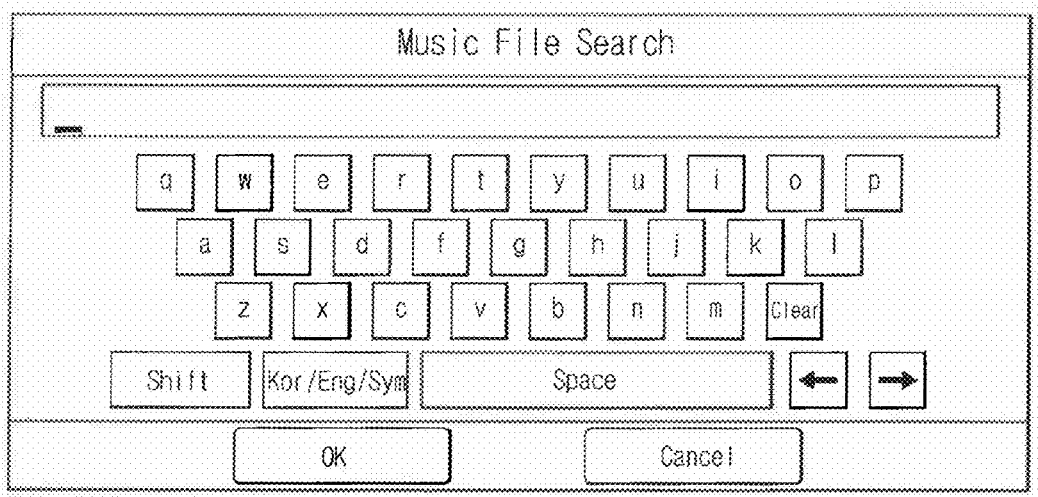
FIG. 7C is a displayed image of a keyboard.

FIGS. 7A and 7B are views illustrating screen images displayed when a tool button (or a tool tab) is selected in accordance with an aspect of the present invention. FIG. 7C is a displayed image of a keyboard according to an aspect of the present invention. When the user selects a tool button (or tab) 352 from among buttons or tabs arranged at the lower end of the user interface, as shown in FIG. 7A, a window A for selecting playlist addition, playlist search, and playlist information is displayed as shown in FIG. 7B.

When one of a search bars in the window A is selected, a keyboard, as shown in FIG. 7C, is displayed on the screen to enable the user to directly input search information as to a desired file. In this case, the user can directly input file information via text, for example by using the keyboard displayed on the screen. In accordance with this configuration, the user can directly search for a desired file by name, title, or text.

Figure 8A:
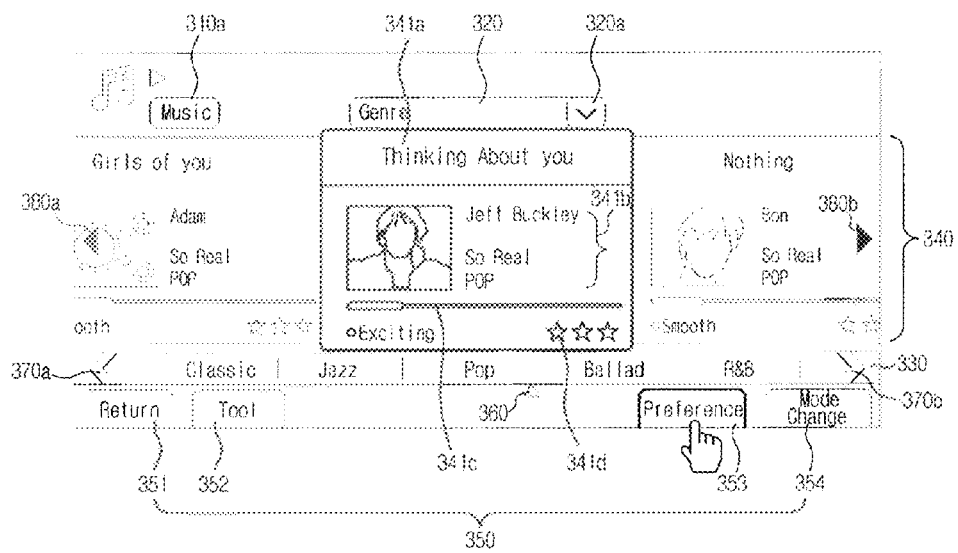
FIGS. 8A and 8B are views illustrating screen images displayed when a preference button is selected in accordance with an aspect of the present invention.
Figure 8B:
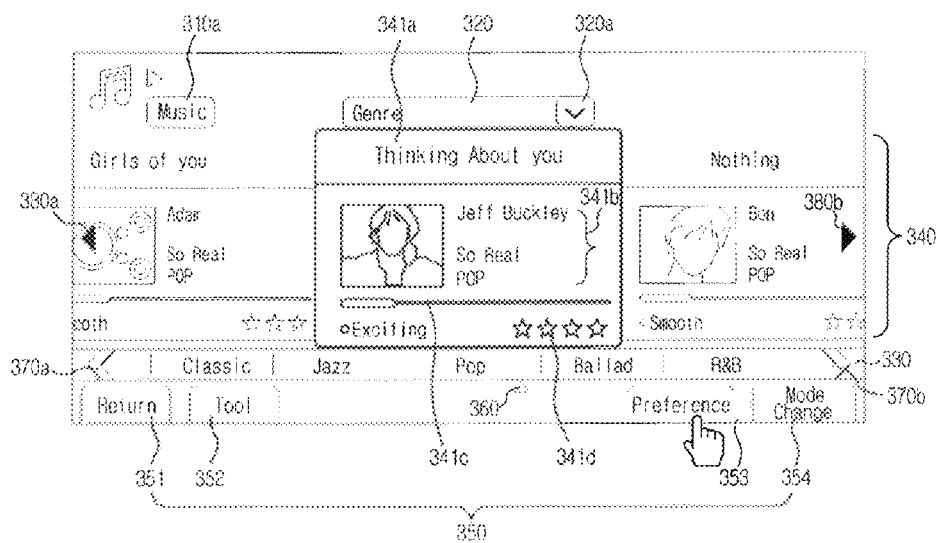

FIGS. 8A and 8B are views illustrating screen images displayed when a preference button (or tab) is selected in accordance with an aspect of the present invention. When a preference button (or tab) 353 is selected, as shown in FIG. 8A, the number of preference marks 341d arranged on the activated file information piece 341 is increased from three to four, as shown in FIG. 8B, for example. In other aspects, the number of the preference marks 341d can be decreased or otherwise changed. When the user selects the item "preference" from among the upper-level items 320, the set preference can be used to sort the associated file or the file information pieces.

Figure 9A:
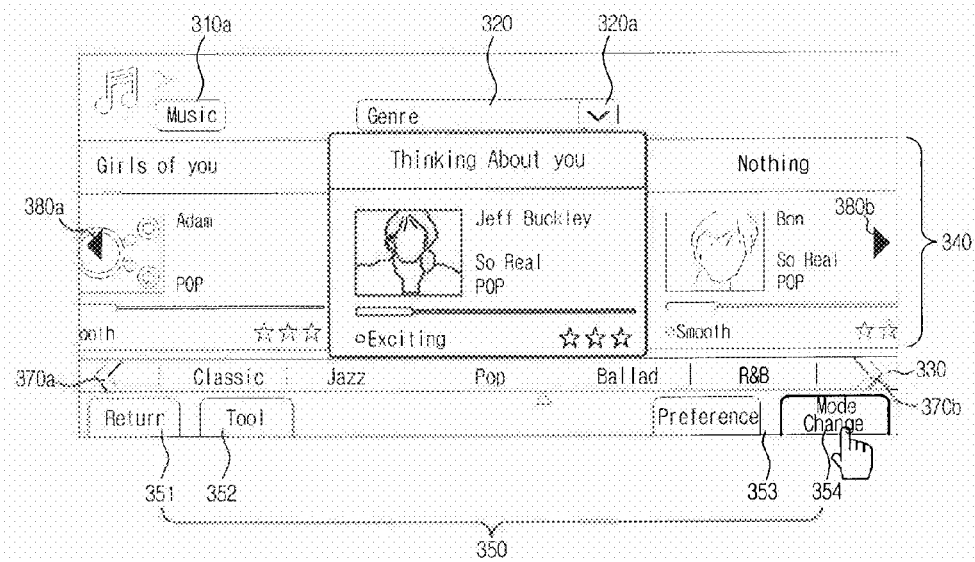
FIGS. 9A and 9B are views illustrating screen images displayed when a mode change button is selected in accordance with an aspect of the present invention.
Figure 9B:
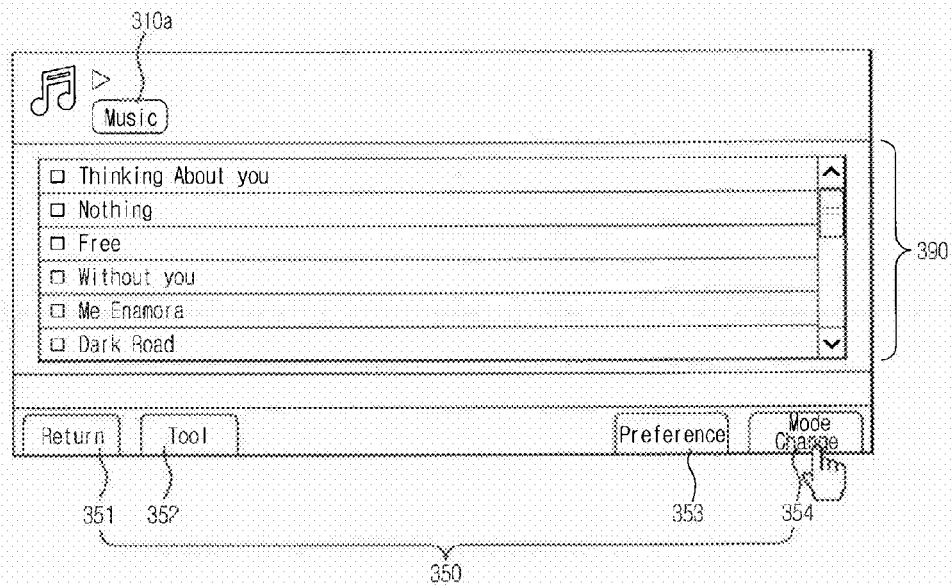

FIGS. 9A and 9B are views illustrating screen images displayed when a mode change button 354 is selected in accordance with an aspect of the present invention. When the mode change button 354 is selected, as shown in FIG. 9A, the screen is changed from a user interface mode based on images to a list mode based on text containing a list of the files 390, as shown in FIG. 9B. Thus, it is possible to provide a retrieval screen desired by the user by changing the retrieval screen between the user interface mode and the list mode using the mode change button 354.

In aspects of the present invention, sorting items may be referred to as menu items.

In various aspects, and/or refers to alternatives chosen from available elements so as to include one or more of the elements. For example, if the elements available include elements X, Y, and Z, and/or refers to X, Y, Z, or any combination thereof.

Although a few aspects of the present invention have been shown and described, it would be appreciated by those skilled in the art that changes may be made in the aspects without departing from the principles and spirit of the invention, the scope of which is defined in the claims and their equivalents.

What is claimed is:

1. An electronic apparatus comprising:
a display;
a storage unit configured to store a plurality of video data; and
a controller configured to:
  display a plurality of video items corresponding to the plurality of video data, respectively, on the display,
    each video item of the plurality of video items being displayed at a same, first size, and including
      a still image for the corresponding video data and being displayed at a second size less than the first size,
      title information for the corresponding video data, and
      a visual indicator indicating a length of play of the corresponding video data, and
  in response to a selection of a video item of the plurality of video items displayed on the display,
    pre-playing the video data corresponding to the selected video item on the display in a form of a thumbnail having a third size greater than the second size, with at least a portion of the thumbnail having a changed color with respect to the display of the still image included in the selected video item, to thereby emphasize the pre-playing video data with respect to non-selected video items of the plurality of video items, while displaying the non-selected video items of the plurality of video items in an inactivated state at the first size along with the pre-playing video data on the display, wherein the thumbnail is displayed in an activated state at the third size so as to cover at least a portion of the still image of at least one of the non-selected video items.

2. The electronic apparatus according to claim 1, wherein the storage unit comprises information about the length of play.

3. The electronic apparatus according to claim 2, wherein the controller determines whether each of the plurality of video data is pre-playable, and displays a button user interface item on a video item corresponding to video data determined to be pre-playable.

4. The electronic apparatus according to claim 1, wherein, when a respective video item of the plurality of video items displayed on the display is dragged, the controller moves a position of the respective video item, based on the dragging.

5. The electronic apparatus according to claim 1, wherein the controller determines whether each of the plurality of video data is pre-playable, and displays a button user interface item on a video item corresponding to video data determined to be pre-playable.

6. An electronic apparatus comprising:
at least one memory storing computer-executable instructions and at least one hardware processor to execute the stored computer executable instructions to cause:
  displaying, on a display, a plurality of video items respectively corresponding to a plurality of video data stored in a storage, each video item of the plurality of video items being displayed on the display at a same, first size, and including:
    a still image for the corresponding video data and being displayed at a second size less than the first size,
    title information for the corresponding video data, and
    a visual indicator indicating a length of play of the corresponding video data, and
  pre-playing, in response to a video item of the plurality of displayed video items being selected, the video data corresponding to the selected video item on the display in a form of a thumbnail having a third size greater than the second size, with at least a portion of the thumbnail having a changed color with respect to the display of the still image included in the selected video item, to thereby emphasize the pre-playing video data with respect to non-selected video items of the plurality of video items, while displaying the non-selected video items of the plurality of video items in an inactivated state at the first size along with the pre-playing video data on the display, wherein the thumbnail is displayed in an activated state at the third size so as to cover at least a portion of the still image of at least one of the non-selected video items.

* * * * *